US008954115B2

(12) United States Patent
Tanioka

(10) Patent No.: US 8,954,115 B2
(45) Date of Patent: Feb. 10, 2015

(54) METHOD AND APPARATUS FOR INFORMING A USER THROUGH HAPTIC SIGNALS

(75) Inventor: Hideaki Tanioka, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 304 days.

(21) Appl. No.: 13/096,360

(22) Filed: Apr. 28, 2011

(65) Prior Publication Data

US 2012/0276956 A1 Nov. 1, 2012

(51) Int. Cl.
 *H04B 1/38* (2006.01)
 *H04M 19/04* (2006.01)
 *H04M 1/57* (2006.01)
 *H04M 1/725* (2006.01)

(52) U.S. Cl.
 CPC ............ *H04M 19/047* (2013.01); *H04M 1/575* (2013.01); *H04M 1/72552* (2013.01); *H04M 2250/22* (2013.01)
 USPC .......................................... 455/566; 715/205

(58) Field of Classification Search
 USPC ......... 455/567, 414.1, 414.2, 414.3; 715/205, 715/764
 See application file for complete search history.

(56) References Cited

U.S. PATENT DOCUMENTS

| 7,020,497 B2* | 3/2006 | Deeds .......................... 455/567 |
| 2003/0083097 A1* | 5/2003 | Kim .............................. 455/553 |
| 2009/0286571 A1* | 11/2009 | Liu ............................. 455/556.1 |
| 2010/0229082 A1* | 9/2010 | Karmarkar et al. ........... 715/205 |
| 2010/0245061 A1* | 9/2010 | Cassidy et al. ............. 340/407.1 |

OTHER PUBLICATIONS

Innovating Haptic Solutions; "*Haptictouch technology: revolutionary. transformative. now;*" http://www.pacinian.com/technology; copyright 2009 Pacinian Corp.; one page, 2009.
Immersion Corporation; "*Haptics for the Digital User Experience;*" http://www.immersion.com; Copyright 2011; one page. 2011, (printed on Apr. 25, 2011).
"*Toshiba brings texture to touch (video);*" http://www.engadget.com/2010/05/21/toshiba-brings-texture-to-touch . . . ; one page, May 21, 2010.

* cited by examiner

*Primary Examiner* — Phuoc H Doan
(74) *Attorney, Agent, or Firm* — Baker Botts L.L.P.

(57) ABSTRACT

According to an embodiment, a computing device is provided that includes a receiver and a signal generator. The receiver may be configured to receive a user query for information regarding a received call or message. The user query may include a physical act performed on the computing device. The signal generator may be configured to generate a haptic signal indicating a response to the user query for the information regarding the call or message.

1 Claim, 3 Drawing Sheets

METHOD AND APPARATUS FOR INFORMING A USER THROUGH HAPTIC SIGNALS

TECHNICAL FIELD OF THE INVENTION

This invention relates generally to mobile computing devices, and more particularly to a method of informing a user about received calls or messages through haptic signals.

BACKGROUND OF THE INVENTION

Cell phones, particularly smart phones, are becoming more ubiquitous and versatile. As demand grew, cell phones design also grew to support more functionality including telephone calls, emails, text messages, web browsing, Instant Messaging, social networking, and scheduling. When any of these functions receives a communication (for example, a call or an email), the cell phone notifies the user through a visual or audio signal. The user may then check the cell phone's display to view information about the received communication (for example, the source or urgency of the communication).

However, it may not always be convenient for the user to check his phone when the communication is received. For example, the user may be in a meeting, where it is hard to watch a display or to listen to a voice feature. Furthermore, the user may have to navigate through several windows and menus before ever seeing the information about the received communication.

SUMMARY OF THE INVENTION

According to one embodiment, a mobile communication device is provided that includes a receiver, a ringer, and a signal generator. The receiver may be configured to receive a swipe indicating a user query for the source of a received call or message. The ringer may be configured to produce an audible signal when the computing device receives a call or message. The mobile communication device may be operable to silence the ringer. The signal generator may be configured to generate a vibration with a first intensity corresponding to a first classification of the source of the call or message and with a second intensity corresponding to a second classification of the source of the received call or message.

According to another embodiment, a method for informing a user through haptic signals may begin by receiving, at a mobile computing device, a user query for information regarding a received call or message. The user query may include some physical act performed on the mobile computing device. The method further includes generating, by the mobile computing device, a haptic signal to indicate a response to the user query for the information regarding the call or message.

According to yet another embodiment, a computing device is provided that includes a receiver and a signal generator. The receiver may be configured to receive a user query for information regarding a received call or message. The user query may include a physical act performed on the computing device. The signal generator may be configured to generate a haptic signal indicating a response to the user query for the information regarding the call or message.

Technical advantages of certain embodiments of the present disclosure include providing a user a way to check for information about received calls or messages without disturbing others. Specifically, only the user may perceive the haptic signal generated in response to his query for information. Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1A:
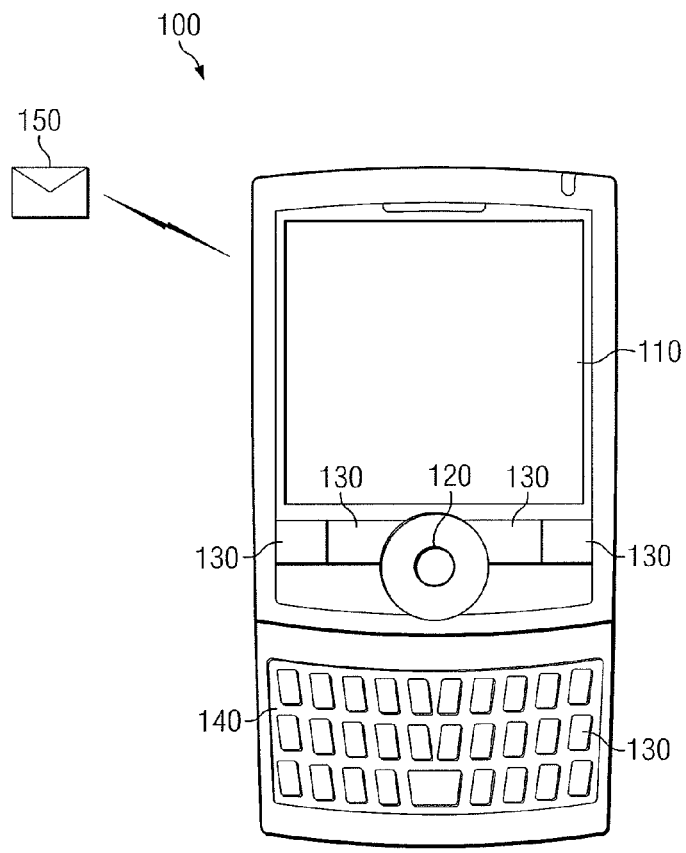
FIG. 1A is a schematic diagram of a computing device.

FIG. 1A is a schematic diagram of a computing device 100. In particular embodiments, computing device 100 may be a mobile computing device. As an example, and not by way of limitation, computing device 100 may be a mobile phone, smart phone, laptop, pager, or any other suitable mobile computing device. Computing device 100 may include a display 110. Display 110 may be configured to display information to users of computing device 100. In particular embodiments, display 110 may be a touchscreen configured to receive user input through tactile touch. As an example, and not by way of limitation, a user may select an item displayed on display 110 by touching display 110 relative to the location of the displayed item. As another example, and not by way of limitation, the user may scroll up or down by swiping up or down on display 110. In some embodiments, display 110 may be configured to generate a haptic signal to the user. As an example and not by way of limitation, display 110 may be configured, according to well-known techniques, to present a texture to a user. For example, display 110 may be configured to feel rough and grainy like sandpaper when the user touches display 110. Although this disclosure describes display 110 performing various functions, this disclosure contemplates display 110 performing any suitable functions.

Computing device 100 may include a trackball 120. In particular embodiments, trackball 120 may be configured to navigate selections on display 110. In some embodiments, a user of computing device 100 may use trackball 120 to make selections displayed on display 110. Computing device 100 may further include a plurality of buttons 130. In particular embodiments, buttons 130 may be pressed by a user of computing device 100 to perform various functions. As an example, and not by way of limitation, buttons 130 may be pressed to power on and power off computing device 100. As another example, and not by way of limitation, buttons 130 may be pressed to initiate or to end telephone calls. In particular embodiments, buttons 130 may be located on the side of computing device 100. Computing device 100 may further include a keyboard 140 configured to enter user input. In particular embodiments, keyboard 140 may include a plurality of buttons 130. In some embodiments, buttons 130 on keyboard 140 may include alphanumeric characters.

Computing device 100 may be configured to receive calls or messages 150. In particular embodiments, calls or messages 150 may be sent to computing device 100 wirelessly. In some embodiments, call or message 150 may be a telephone call, an email message, a text message, an SMS message, or any other suitable call or message received at computing device 100. In some embodiments, computing device 100 may be configured to generate a visible or audible signal to indicate a call or message 150 is received. As an example and not by way of limitation, computing device 100 may include a ringer that produces a ringing noise or a light that flashes when a call or message 150 is received. In some embodiments, the ringer may be silenced.

According to the teachings of the disclosure, computing device 100 may allow a user to check for calls or messages in a manner that does not disturb others. For example, a user may be in a meeting or any other setting not conducive to checking computing device 100, when computing device 100 receives a call or message 150. The user may wish to check certain information regarding call or message 150, such as the source, without disrupting the meeting. Computing device 100 may be silenced, but the user may still disturb others if the user begins operating the computing device in plain view. In these situations, computing device 100 may allow the user to perceive information about the call or message 150 without disrupting the meeting by generating a haptic signal in response to a user action. The haptic signal may be perceived only by the user and would not disturb other meeting participants. As an example and not by way of limitation, the user may swipe up or down on display 110 to request information on the source of call or message 150. Computing device 100 may generate a vibration with a particular intensity to indicate the source of call or message 150. For example, computing device 100 may generate a very intense vibration if the user's family member sent call or message 150 or a light vibration if the user's boss or coworker sent call or message 150. By using computing device 100, the user may check for the source of a call or message without disturbing others. The user may swipe display 110 while computing device 100 is in the user's pocket, and computing device 100 may generate a vibration that only the user may perceive. Computing device 100 would allow the user to check for information regarding received calls or messages 150 regardless of the people around the user.

Figure 1B:
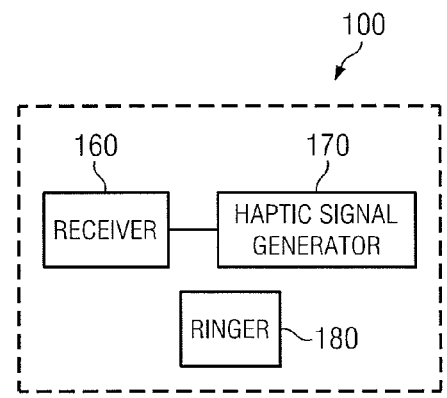
FIG. 1B illustrates certain functional components of the computing device of FIG. 1A.
Figure 1C:
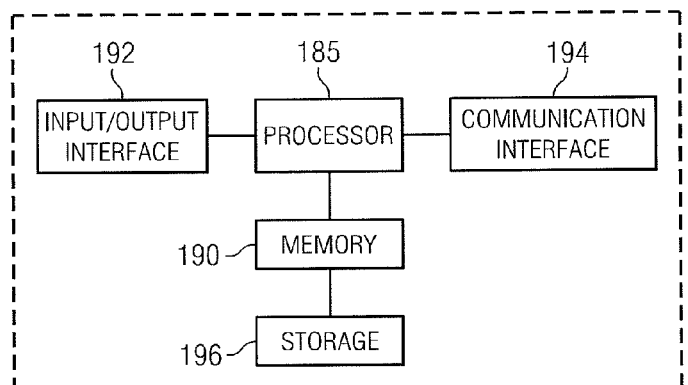
FIG. 1C is a functional block diagram of the computing device of FIG. 1A, illustrating a physical implementation configured to execute software.
Figure 2:
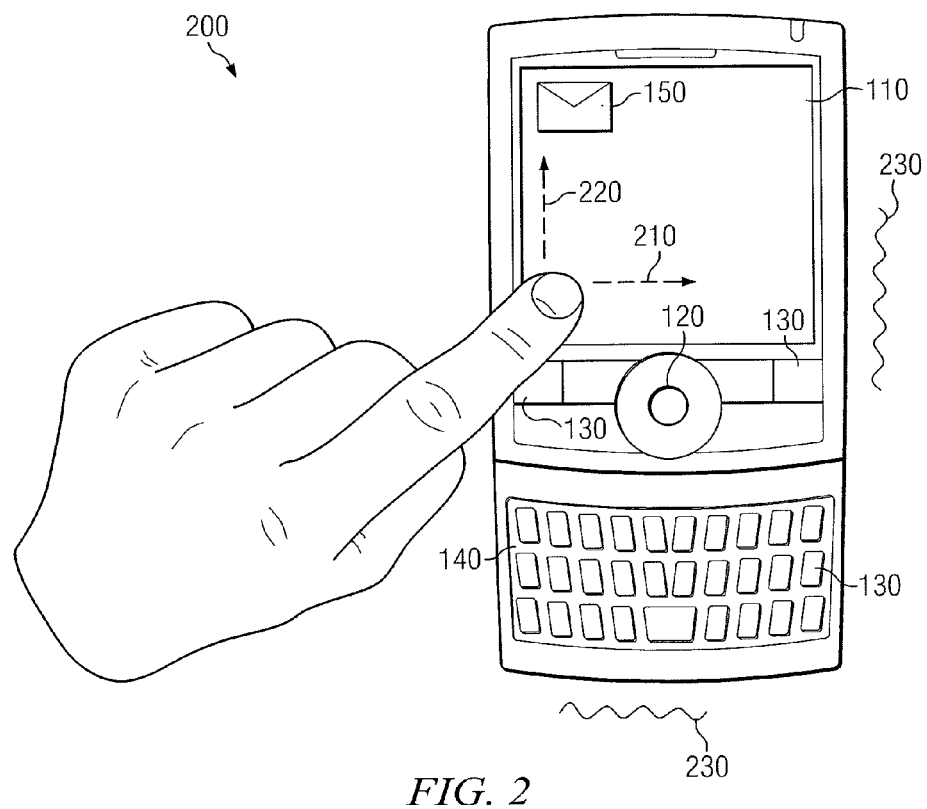
FIG. 2 is a schematic diagram of the computing device of FIG. 1A receiving a user query for information regarding a received call or message, and generating a haptic signal in response to the user query.
Figure 3:
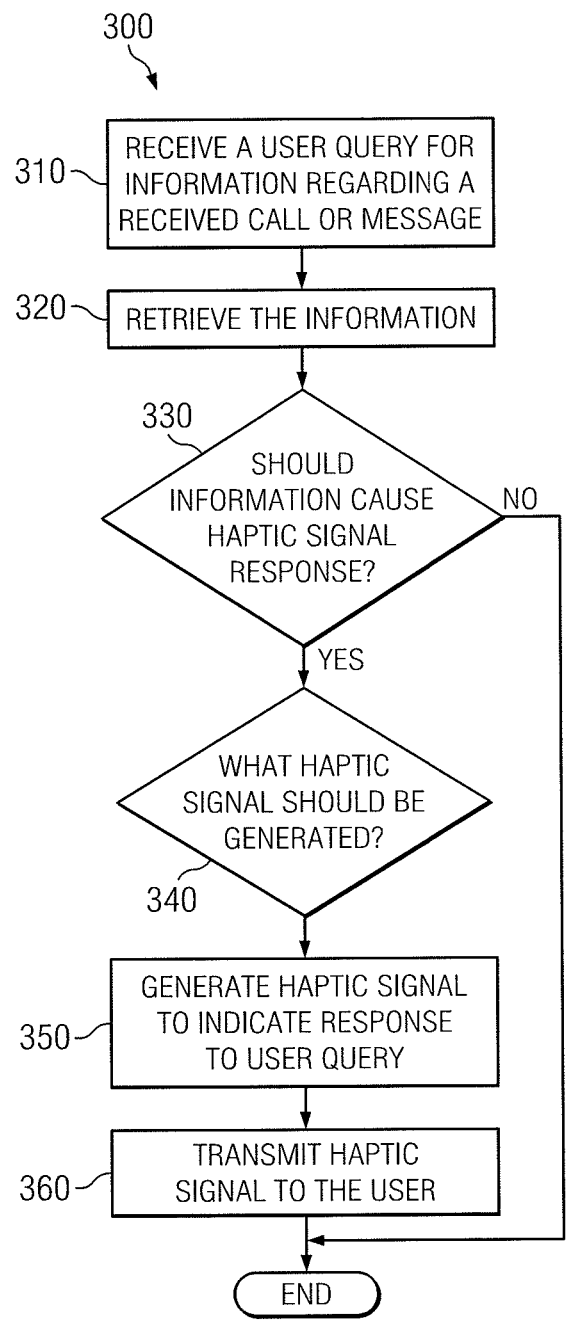
FIG. 3 is a flowchart illustrating a method of informing a user of the computing device of FIG. 1A through haptic signals.

FIGS. 1B-3 describe particular embodiments of the present invention. FIG. 1B describes certain functional components of computing device 100. FIG. 1C describes a physical implementation of computing device 100 configured to execute software. FIG. 2 describes computing device 100 receiving a user query for information regarding a received call or message, and generating a haptic signal in response to the user query. FIG. 3 describes a method executed by computing device 100 to inform a user through haptic signals.

FIG. 1B illustrates certain functional components of the computing device of FIG. 1A. In FIG. 1B, computing device 100 is provided. Computing device 100 may include a receiver 160, a haptic signal generator 170, and a ringer 180. Receiver 160 may be configured to receive a request for information regarding a received call or message. Haptic signal generator 170 may be configured to generate a haptic signal in response to the request. Ringer 180 may be configured to generate an audible signal when computing device 100 receives a call or message 150. Computing device 100 may be operable to silence ringer 180.

Computing device 100 may include a receiver 160. In particular embodiments, receiver 160 may be a touchscreen or a sensor configured to detect a button press. Although this disclosure describes receiver 160 being particular a component, this disclosure contemplates receiver 160 being any suitable component. In particular embodiments, receiver 160 may be configured to receive a user query for information regarding a received call or message. In particular embodiments, the user query may include a physical act performed on computing device 100. As an example and not by way of limitation, the user query may be a swipe, a shaking of computing device 100, or a push of a button on computing device 100. In particular embodiments, receiver 160 may be configured to receive a user query for the source of a call or message. In some embodiments, receiver 160 may be configured to receive a user query for the urgency of a call or message. Although this disclosure describes receiver 160 receiving user queries for particular properties of calls or messages, this disclosure contemplates receiver 160 being configured to receive user queries for any suitable property of a call or message.

Computing device 100 may further include haptic signal generator 170. In particular embodiments, haptic signal generator 170 may be a motor, a processor operable to execute software to control a vibration component, or a processor configured to execute software to generate a texture on display 110. Although this disclosure describes haptic signal generator 170 being a particular component, this disclosure contemplates haptic signal generator 170 being any suitable component. In particular embodiments, haptic signal generator 170 may be configured to generate a haptic signal indicating a response to the user query for the information regarding the call or message. In particular embodiments, haptic signal generator 170 may vary particular aspects of the generated haptic signal to indicate particular responses to the user query. As an example and not by way of limitation, haptic signal generator 170 may generate a haptic signal with a particular intensity to indicate a particular response. As another example and not by way of limitation, haptic signal generator 170 may generate a haptic signal with a particular duration to indicate a particular response. As yet another example and not by way of limitation, haptic signal generator 170 may generate a particular texture on display 110 to indicate a particular response.

FIG. 1C illustrates a physical implementation of the computing device of FIG. 1A configured to execute software. As provided in FIG. 1C, computing device 100 may include a processor 185, a memory 190, a storage 196, an I/O interface 192, and a communication interface 194.

In particular embodiments, processor 185 includes hardware for executing instructions, such as those making up a computer program. As an example and not by way of limitation, to execute instructions, processor 185 may retrieve (or fetch) the instructions from an internal register, an internal cache, memory 190, or storage 196; decode and execute them; and then write one or more results to an internal register, an internal cache, memory 190, or storage 196. In particular embodiments, processor 185 may be configured to execute instructions to generate a haptic signal indicating a response to a user query for information regarding a call or message.

In particular embodiments, memory 190 includes main memory for storing instructions for processor 185 to execute or data for processor 185 to operate on. In particular embodiments, storage 196 includes mass storage for data or instructions. As an example and not by way of limitation, storage 196 may include removable or non-removable (or fixed) media, where appropriate.

In particular embodiments, I/O interface 192 includes hardware, software, or both providing one or more interfaces for communication between computing device 100 and a user. Computing device 100 may include one or more of these I/O devices, where appropriate. As an example and not by way of limitation, an I/O device may include a keyboard 140, touchscreen, microphone, display 110, speaker, camera, trackball 120, video camera, another suitable I/O device or a combination of two or more of these. In particular embodiments, I/O interface 192 may be configured to receive requests for particular properties of calls or messages.

In particular embodiments, communication interface 194 includes hardware, software, or both providing one or more interfaces for communication (such as, for example, packet-based communication) between computing device 100 and one or more other computing devices 100 or one or more networks. As an example and not by way of limitation, communication interface 194 may include an antenna or a wireless NIC. This disclosure contemplates any suitable network and any suitable communication interface 194 for it. As an example and not by way of limitation, computing device 100 may communicate with an ad hoc network, a personal area network (PAN), a local area network (LAN), a wide area network (WAN), a metropolitan area network (MAN), or one or more portions of the Internet or a combination of two or more of these. As an example, computing device 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computing device 100 may include any suitable communication interface 194 for any of these networks, where appropriate. Communication interface 194 may include one or more communication interfaces 194, where appropriate. Although this disclosure describes and illustrates a particular communication interface, this disclosure contemplates any suitable communication interface.

FIG. 2 illustrates the computing device of FIG. 1A receiving a user query for information regarding a received call or message, and generating a haptic signal in response to the user query. As provided in FIG. 2, computing device 200 may include display 110, track ball 120, and buttons 130.

Computing device 200 may have received call or message 150. In particular embodiments, a user may want to check the urgency of call or message 150, but the user may be in a setting where the user cannot take computing device 200 out of the user's pocket to check call or message 150. In this situation, the user may send a request for information regarding the received call or message 150. In particular embodiments, computing device 200 may generate a haptic signal in response to the request. In this manner, the user may check different properties of call or message 150 by performing different actions.

In particular embodiments, a user may a request information regarding the received call or message 150. As an example and not by way of limitation, the user may perform a horizontal swipe 210 on display 194 to send the request. As another example and not by way of limitation, the user may perform a vertical swipe 220 on display 110. As yet another example and not by way of limitation, the user may scroll or push on track ball 120 to send the request. As yet another example and not by way of limitation, the user may push one of buttons 130 to send the request. In particular embodiments, different actions performed by the user may indicate requests for different types of information regarding the received call or message 150. As an example and not by way of limitation, a horizontal swipe 210 on display 110 may indicate a request for the source of call or message 150, and a vertical swipe 220 on display 110 may indicate a request for the urgency of the received call or message 150.

In particular embodiments, computing device 200 may generate a haptic signal in response to the user query. As an example and not by way of limitation, computing device 200 may generate a vibration 230 in response to the user query. As another example and not by way of limitation, computing device 200 may generate a texture on display 110 in response to the user query. In particular embodiments, computing device 200 may vary particular aspects of the generated haptic signal to indicate different responses to the user query. As an example and not by way of limitation, computing device 200 may vary the intensity of vibration 230 to indicate a particular response to the user query. As another example and not by way of limitation, computing device 200 may vary the duration of vibration 230 to indicate a particular response to the user query.

In particular embodiments, a user may check different properties of a received call or message 150 by performing different actions. As an example and not by way of limitation, a user may perform a horizontal swipe 210 to send a user query regarding the source of call or message 150. Computing device 200 may generate an intense vibration 230 to indicate the call or message 150 is from the user's spouse. Computing device 200 may generate a less intense vibration 230 to indicate the call or message is from the user's boss. As another example and not by way of limitation, the user may perform a vertical swipe 220 on display 110 to send a user query for information regarding the urgency of call or message 150. Computing device 200 may generate an intense vibration to indicate the call or message 150 is urgent or a less intense vibration 230 to indicate the call or message is not urgent. In some embodiments, computing device 200 may vary the duration of vibration 230 to indicate the different responses to the user queries. In some embodiments, computing device 200 may vary a texture on display 110 to indicate the responses to the user queries.

FIG. 3 illustrates a method of informing a user of the computing device of FIG. 1A through haptic signals. As provided in FIG. 3, method 300 begins at step 310 by receiving a user query for information regarding a received call or message. In particular embodiments, the user query may include a swipe, a scroll, a shake, a push of a button, or any other suitable action to indicate a user query. In step 320, the computing device may retrieve the requested information. In step 330, the computing device determines if the information should cause a haptic signal response. If the information should not cause a haptic signal response, then method 300 ends. If the information should cause a haptic signal response, then in step 340, the computing device determines what haptic signal should be generated. In step 350, the computing device generates the haptic signal to indicate a response to the user query. As an example and not by way of limitation, the computing device may generate a vibration with a particular intensity or duration to indicate the response to the user query. As another example and not by way of limitation, the computing device may generate a particular texture to indicate the response to the user query. In step 360, the computing device transmits the haptic signal to the user.

Although the present invention has been described above in connection with several embodiments, changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A mobile communication device comprising:
   a touchscreen configured to receive a swipe indicating a user query for the source of a received call or message;
   a ringer configured to generate an audible signal in response to the mobile communication device receiving the call or message, the mobile communication device operable to silence the ringer; and
   a signal generator configured to generate a vibration with a first intensity corresponding to a first classification of the source of the received call or message, and a vibration with a second intensity corresponding to a second classification of the source of the received call or message.

* * * * *